March 19, 1935. W. DEICKE 1,994,812
SPREADING ATTACHMENT FOR DUMP TRUCKS
Filed March 6, 1933
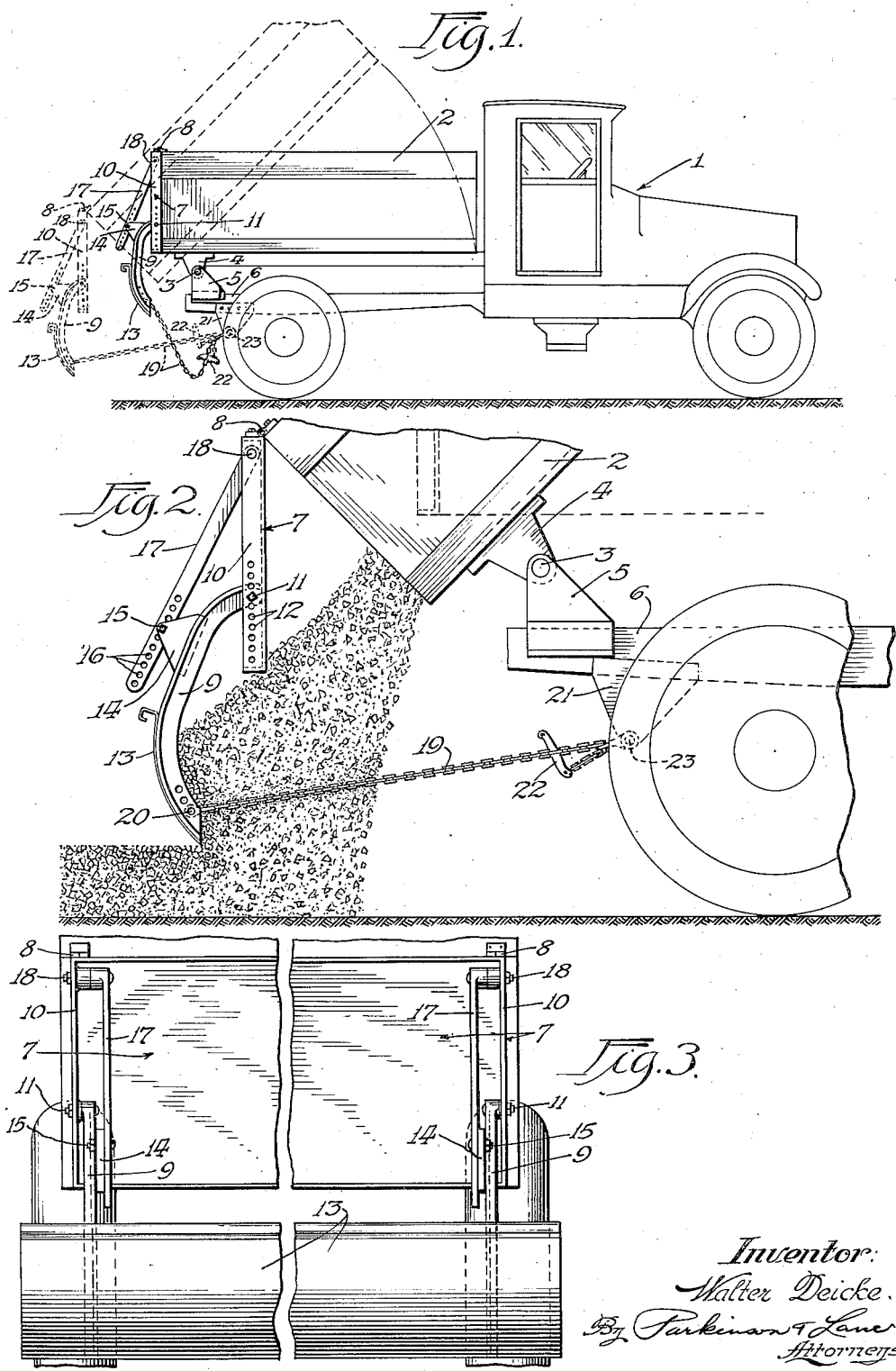

Patented Mar. 19, 1935

1,994,812

UNITED STATES PATENT OFFICE 1,994,812

SPREADING ATTACHMENT FOR DUMP TRUCKS

Walter Deicke, Lombard, Ill.

Application March 6, 1933, Serial No. 659,707

12 Claims. (Cl. 94—44)

The present invention relates to a spreading attachment and more in particular to such an attachment or blade adapted to be detachably mounted on the end or tail gate of any standard dumping truck.

Among the objects of the present invention is to provide a novel spreading attachment adapted to be mounted on the tail or end gate of a truck or other vehicle and which is adapted to evenly spread the material being dumped therefrom.

A further object of the invention is the provision of a novel spreading device adapted to be attached to the rear of a dumping body of a truck or other vehicle and drawn along therewith to spread dirt, gravel, stone and/or other road material as it is discharged or dumped from the truck or vehicle.

A still further object is the provision of a novel spreading attachment which may be easily and readily mounted on the end gate or at the rear of the body of any standard dump truck and quickly detached therefrom whenever desired.

However, the attachment is so constructed and mounted that it may be retained upon the body of the truck at all times without impairing the operation or efficiency of such truck or other vehicle.

Another object of the invention is to provide an adjustable spreader attachment for dump bodies. The spreading blade may be adjusted through a very wide range to permit spreading of dirt, gravel, stone, sand and/or other road material. In the present disclosed embodiment, this adjustment permits the spreading of any desired thickness from one inch to eighteen inches, although it is to be understood the disclosed embodiment and range of adjustment is to be taken as illustrative only and that numerous other ranges of adjustment may be provided.

Yet another object of the invention is the provision of a spreading attachment which is automatically operated upon a raising of the dump body and opening of the tail or end gate. When the body is lowered or returned to its normal or proper position, the blade or spreader is automatically raised to inoperative position whereby the blade or spreader clears all obstructions and in no way interferes with the normal operation of the truck.

A still further object is the provision of a novel spreading attachment including a blade adapted to be tilted or adjusted transverse of the road bed. This feature is highly desirable in banking or grading a road wherein the depth of the dirt or other road material being distributed, may be varied.

Further objects are to provide a construction of maximum simplicity, efficiency, economy and ease of assembly and operation, and such further objects, advantages and capabilities as will later more fully appear, and are inherently possessed thereby.

The invention further resides in the combination, construction and arrangements of parts illustrated in the accompanying drawing, and while there is shown therein a preferred embodiment, it is to be understood that the same is susceptible of modification and change, and comprehends other details, arrangements of parts, features and constructions, without departing from the spirit of the invention.

In the drawing:

Fig. 1 is a view in side elevation of a dump truck provided with a novel spreading attachment;

Fig. 2 is a fragmentary enlarged view of the rear of the truck and showing the novel attachment in spreading position;

Fig. 3 is a fragmentary view in rear elevation of the novel attachment.

Referring more particularly to the disclosure in the drawing, the novel attachment is shown as mounted upon a dump truck 1 having a dump body 2 adapted to be raised or lowered by any suitable means for discharging the contents of the body. This body is pivoted at 3 upon cooperating brackets 4 and 5 mounted on the dump body 2 and frame 6, respectively. The dump body is provided at its rear end with a tail or end gate 7 pivoted upon hinges 8. This end gate forms a normal closure for the body whereby to prevent discharge of the contents of the dump body or truck when it is in a lowered or hauling position and to permit free discharge of such contents when the body or truck is in an elevated position. The aforementioned truck construction may be any of the standard makes or models.

The novel spreading attachment comprises brace arms or bars 9 mounted at opposite sides of the end gate 7 and pivotally attached to the opposite side flanges 10 of the end gates by means of a pin, bolt or the like 11 seating within an opening in the bars 9 and one of a plurality of openings 12 in the flanges 10. These arms or bars 9 carry at their lower end a transversely extending blade or spreading member 13 adapted to spread the material discharged from the dump truck. Bracket members 14 are mounted on the arms or bars 9 and are connected by a pin, bolt or the like 15 seating in one of a plurality of openings 16 in the bars or brace arms 17. The upper end of these bars or brace arms is pivotally connected to the flanges 10 of the end gate by means of a pin, bolt or the like 18.

By reason of the openings 12 in the flanges 10 of the end or tail gate and the openings 16 of the brace arms 17, it will be readily seen that the blade 13 may be raised or lowered to vary the depth of the material to be spread. Also, the blade may be tilted to different positions by adjusting the brace bars on the opposite sides of the end gate to different positions. This may be readily accomplished by reason of the numerous openings provided in these brace bars permitting such adjustment.

In order to limit the position of the blade or spreading member 13 and to hold it to its work, the invention comprehends the provision of a chain or other flexible member 19 adapted to be connected at 20 to the lower end of the arms or bars 9 and at their opposite ends to the bracket 21 mounted on the frame 6 of the truck. A grab hook or other suitable means 22 may be provided for connecting the chain to a loop 23 and for adjusting the length of such chain or flexible member.

The present novel construction of spreading attachment permits the efficient handling of dirt or other lumpy material and which would have a tendency to clog in structures in which there is a hopper arrangement. It is likewise admirably adapted for handling gravel, sand, stones or other road material. It may be adjusted to permit the spreading of any desired thickness, depending merely upon the number and range of openings in the flanges 10 and brace arms or rods 17. Upon a raising of the body, the tail or end gate opens by reason of its pivotal connection whereby to permit a discharge of the contents of the dump body. Upon opening of the tail or end gate, the attachment automatically operates to spread and level the material to the adjusted depth. When the dump body is lowered to its normal position, the tail or end gate closes the discharge opening of the truck and the blade and attachment is raised to a position whereby it will clear all obstacles or obstructions. Thus it may be retained in operative position without in any way interfering with the normal operation of the truck. However, if it is desired to remove the attachment, this may be done in a very few minutes, since it is only necessary to remove the several pins or bolts holding it in place.

The present novel construction may be readily and easily attached to any standard dump truck and is quickly detached therefrom. When it is being operated, the weight and force of the material which is being dumped and positioned against the blade will maintain the blade in its proper position as the truck is being moved or propelled forward.

Having thus disclosed the invention, I claim:

1. In a dump truck provided with a pivoted body adapted to discharge its contents at the rear thereof, an end gate for normally closing said body and preventing discharge at said rear and a spreading attachment including a blade mounted on and suspended from the rear of the truck and movable with said end gate for automatically spreading the contents of the truck upon elevation of said body on its pivot and a forward movement of the truck.

2. In a dump truck provided with a body pivoted adjacent its rear end whereby upon a raising of the body the contents thereof are discharged from such rear end, and a spreading attachment pivotally mounted at and suspended from the rear of said body and movable to spreading position upon a raising of the body to discharge the contents thereof.

3. In a dump truck provided with a body pivoted adjacent its rear end whereby upon a raising of the body the contents thereof are discharged from such rear end, a pivoted closure for closing said rear end when the body is in lowered position and adapted to be swung to open position when the body is raised, and a spreading attachment mounted on said closure and movable therewith.

4. In a dump truck having a body pivoted on the truck frame for permitting elevation thereof and the emptying of the contents of the body, a closure pivoted on said body and adapted to swing open upon an elevation of the body to discharge the contents thereof, and a spreading attachment supported on and depending from said closure and provided with a blade for spreading the material discharged from the body.

5. In a truck having a dump body provided with an end gate pivoted at its top and adapted to swing open to discharge the contents of the truck upon an elevation of the body, and a blade mounted on said end gate and movable to spreading position upon an elevation of said body, said blade being adapted to spread and level the discharged contents as the truck is moved forwardly.

6. In a truck having a dump body provided with an end gate pivoted at its top and adapted to swing open to discharge the contents of the truck upon an elevation of the body, and a detachable blade structure positioned on and carried by said end gate and swingable therewith, said structure being adapted to spread the contents discharged through said end gate as the truck is moved forwardly.

7. In a truck having a dump body provided with an end gate pivoted at its top and adapted to swing open to discharge the contents of the truck upon an elevation of the body, and a blade mounted on and suspended from said end gate and adapted to spread and level the discharged contents as the truck is moved forwardly, said blade being adjustable whereby to vary the depth of the material to be spread.

8. A spreading attachment adapted to be mounted upon the body of a dump truck, comprising arm members connected to the end gate of said body and a blade depending from said arm members and adapted to spread the material discharged through said end gate.

9. A spreading attachment adapted to be mounted upon the body of a dump truck, comprising arm members connected to the end gate of said body and a spreading member adjustably mounted on said arm members and adapted to spread the material discharged through said end gate.

10. A spreading attachment adapted to be mounted upon the body of a dump truck, comprising a blade mounted on and depending from the end gate of the body and movable therewith whereby upon the opening of the end gate to discharge the contents of the body, the blade automatically assumes a position to spread and level said discharged contents, and when said end gate is closed, the blade is retained in a position sufficiently above the ground as not to interfere with the normal operation of the truck.

11. A spreading attachment adapted to be mounted upon the body of a dump truck, comprising a blade mounted on and depending from the end gate of the body and movable therewith whereby upon the opening of the end gate to discharge the contents of the body, the blade automatically assumes a position to spread and level said discharged contents, and when said end gate is closed, the blade is retained in a position sufficiently above the ground as not to interfere with the normal operation of the truck, and means connecting said blade to the frame of the truck whereby to limit the position of the blade with respect to the truck when the contents of the body are being discharged.

12. A spreading attachment adapted to be mounted upon the body of a dump truck, comprising arm members connected at their upper ends to the end gate of said body, a spreading blade mounted on said arm members, and a chain connecting the lower ends of said arms to the frame of the truck.

WALTER DEICKE.